(12) United States Patent
Wolas

(10) Patent No.: US 7,708,338 B2
(45) Date of Patent: May 4, 2010

(54) VENTILATION SYSTEM FOR SEAT

(75) Inventor: Scott R. Wolas, Newbury Park, CA (US)

(73) Assignee: Amerigon Incorporated, Northville, MI (US)

( * ) Notice: Subject to any disclaimer, the term of this patent is extended or adjusted under 35 U.S.C. 154(b) by 0 days.

(21) Appl. No.: 11/870,376

(22) Filed: Oct. 10, 2007

(65) Prior Publication Data
US 2008/0084095 A1 Apr. 10, 2008

Related U.S. Application Data

(60) Provisional application No. 60/850,699, filed on Oct. 10, 2006.

(51) Int. Cl.
A47C 7/74 (2006.01)
(52) U.S. Cl. .............. 297/180.1; 297/180.12; 297/180.13; 297/180.14; 297/180.15
(58) Field of Classification Search ............ 297/180.1, 297/180.12, 180.13, 180.14, 180.15
See application file for complete search history.

(56) References Cited

U.S. PATENT DOCUMENTS

| | | | |
|---|---|---|---|
| 3,136,577 A | 6/1964 | Richard | |
| 3,137,523 A | 6/1964 | Karner | |
| 4,413,857 A | 11/1983 | Hayashi | |
| 4,671,567 A | 6/1987 | Frobose | |
| 4,685,727 A | 8/1987 | Cremer et al. | |
| 4,773,494 A * | 9/1988 | Anderson | 297/180.12 X |
| 4,966,145 A * | 10/1990 | Kikumoto et al. | 297/180.15 X |
| 4,981,324 A | 1/1991 | Law | |
| 5,002,336 A | 3/1991 | Feher | |
| D316,942 S | 5/1991 | Johnson | |
| 5,106,161 A | 4/1992 | Meiller | |
| 5,117,638 A | 6/1992 | Feher | |
| 5,385,382 A | 1/1995 | Single, II et al. | |
| 5,487,197 A | 1/1996 | Iskra et al. | |
| 5,597,200 A | 1/1997 | Gregory et al. | |
| 5,626,021 A | 5/1997 | Karunasiri et al. | |
| 5,626,386 A * | 5/1997 | Lush | 297/180.13 |
| 5,645,314 A | 7/1997 | Liou | |
| D381,856 S | 8/1997 | Loud | |
| 5,692,952 A | 12/1997 | Chih-Hung | |
| D396,984 S | 8/1998 | Harvey et al. | |
| 5,902,014 A * | 5/1999 | Dinkel et al. | 297/180.12 X |

(Continued)

FOREIGN PATENT DOCUMENTS

DE 10238552 8/2001

(Continued)

*Primary Examiner*—Rodney B White
(74) *Attorney, Agent, or Firm*—Knobbe Martens Olson & Bear, LLP (57) ABSTRACT

A climate controlled seat assembly comprises a chamber defined by a substantially fluid impermeable layer, the fluid impermeable layer having a first side and second side, the first side comprising a plurality of openings, a support structure positioned within the chamber, the support structure being configured to substantially maintain the shape of the chamber, a fluid transfer device configured to provide a volume of fluid to the chamber, a fluid inlet in fluid communication with both the chamber and the fluid transfer device, a fluid distribution layer positioned adjacent to the first side of the fluid impermeable layer and a seat covering positioned along the fluid distribution layer. In some embodiments, the fluid distribution layer is configured to generally distribute fluid from the openings toward the seat covering.

8 Claims, 6 Drawing Sheets

U.S. PATENT DOCUMENTS

| | | |
|---|---|---|
| 5,906,416 A | 5/1999 | Rasmussen |
| 5,924,766 A | 7/1999 | Esaki et al. |
| 5,927,817 A | 7/1999 | Ekman et al. |
| 5,934,748 A * | 8/1999 | Faust et al. ............ 297/180.12 |
| 5,963,997 A | 10/1999 | Hagopian |
| 6,003,950 A | 12/1999 | Larsson |
| 6,019,420 A * | 2/2000 | Faust et al. ............ 297/180.14 |
| 6,033,432 A | 3/2000 | Augustine et al. |
| 6,059,018 A | 5/2000 | Yoshinori et al. |
| 6,062,641 A | 5/2000 | Suzuki et al. |
| 6,079,485 A | 6/2000 | Esaki et al. |
| 6,109,688 A * | 8/2000 | Wurz et al. ............ 297/180.14 |
| 6,119,463 A | 9/2000 | Bell |
| 6,145,925 A | 11/2000 | Eksin et al. |
| 6,154,690 A | 11/2000 | Coleman |
| 6,186,592 B1 | 2/2001 | Orizaris et al. |
| 6,189,966 B1 * | 2/2001 | Faust et al. ............ 297/180.14 |
| 6,196,627 B1 * | 3/2001 | Faust et al. ............ 297/180.14 |
| 6,206,465 B1 | 3/2001 | Faust et al. |
| 6,210,427 B1 | 4/2001 | Augustine et al. |
| 6,216,299 B1 | 4/2001 | Kohlman |
| 6,291,803 B1 * | 9/2001 | Fourrey ............... 297/180.12 X |
| 6,367,106 B1 | 4/2002 | Gronsman |
| 6,511,125 B1 * | 1/2003 | Gendron ................ 297/180.11 |
| 6,541,737 B1 * | 4/2003 | Eksin et al. ......... 297/180.12 X |
| RE38,128 E | 6/2003 | Gallup et al. |
| 6,598,251 B2 | 7/2003 | Habboub et al. |
| 6,604,785 B2 | 8/2003 | Bargheer et al. |
| 6,606,866 B2 | 8/2003 | Bell |
| 6,619,736 B2 | 9/2003 | Stowe et al. |
| 6,626,488 B2 | 9/2003 | Pfahler |
| 6,644,735 B2 | 11/2003 | Bargheer et al. |
| 6,676,207 B2 | 1/2004 | Rauh et al. |
| 6,700,052 B2 | 3/2004 | Bell |
| 6,761,399 B2 | 7/2004 | Bargheer et al. |
| 6,772,825 B2 | 8/2004 | Lachenbruch et al. |
| 6,786,541 B2 * | 9/2004 | Haupt et al. ......... 297/180.14 X |
| 6,786,545 B2 | 9/2004 | Bargheer et al. |
| 6,808,230 B2 | 10/2004 | Buss et al. |
| 6,828,528 B2 | 12/2004 | Stowe et al. |
| 6,857,697 B2 | 2/2005 | Brennan et al. |
| 6,893,086 B2 * | 5/2005 | Bajic et al. ............ 297/180.13 |
| 6,976,734 B2 | 12/2005 | Stoewe |
| 7,040,710 B2 | 5/2006 | White et al. |
| 7,052,091 B2 * | 5/2006 | Bajic et al. ......... 297/180.12 X |
| 7,070,232 B2 | 7/2006 | Minegishi et al. |
| 7,108,319 B2 | 9/2006 | Hartwich et al. |
| 7,114,771 B2 * | 10/2006 | Lofy et al. ............. 297/180.13 |
| 7,201,441 B2 | 4/2007 | Stoewe et al. |
| 7,338,117 B2 * | 3/2008 | Iqbal et al. ............. 297/180.11 |
| 7,356,912 B2 * | 4/2008 | Iqbal et al. .................... 29/613 |
| 7,370,911 B2 * | 5/2008 | Bajic et al. ............. 297/180.12 |
| 7,425,034 B2 | 9/2008 | Bajie et al. |
| 7,478,869 B2 | 1/2009 | Lazanja et al. |
| 2002/0103520 A1 | 8/2002 | Latham |
| 2003/0160479 A1 * | 8/2003 | Minuth et al. .......... 297/180.14 |
| 2004/0036326 A1 * | 2/2004 | Bajic et al. ............. 297/180.14 |
| 2004/0090093 A1 | 5/2004 | Kamiya et al. |
| 2004/0123391 A1 | 7/2004 | Call |
| 2005/0066505 A1 * | 3/2005 | Iqbal et al. .......... 297/180.14 X |
| 2005/0093347 A1 * | 5/2005 | Bajic et al. ............. 297/180.13 |
| 2005/0140189 A1 * | 6/2005 | Bajic et al. ............... 297/180.1 |
| 2005/0173950 A1 * | 8/2005 | Bajic et al. ............. 297/180.14 |
| 2005/0229317 A1 | 10/2005 | Heiser et al. |
| 2005/0285438 A1 | 12/2005 | Ishima et al. |
| 2006/0087160 A1 | 4/2006 | Dong et al. |
| 2006/0130490 A1 | 6/2006 | Petrovski |
| 2006/0152044 A1 * | 7/2006 | Bajic et al. ............. 297/180.14 |
| 2006/0158011 A1 * | 7/2006 | Marlovits et al. ........ 297/180.1 |
| 2006/0197363 A1 * | 9/2006 | Lofy et al. ............. 297/180.13 |
| 2006/0208540 A1 * | 9/2006 | Lofy et al. ............. 297/180.14 |
| 2006/0214480 A1 | 9/2006 | Terech |
| 2006/0273646 A1 | 12/2006 | Comiskey et al. |
| 2007/0035162 A1 * | 2/2007 | Bier et al. ............... 297/180.15 |
| 2007/0040421 A1 * | 2/2007 | Zuzga et al. ............ 297/180.13 |
| 2007/0069554 A1 | 3/2007 | Comiskey et al. |
| 2007/0158981 A1 * | 7/2007 | Almasi et al. .......... 297/180.12 |
| 2007/0200398 A1 | 8/2007 | Wolas et al. |
| 2008/0047598 A1 | 2/2008 | Lofy |
| 2008/0087316 A1 | 4/2008 | Inaba et al. |
| 2008/0100101 A1 * | 5/2008 | Wolas .................... 297/180.15 |
| 2008/0143152 A1 | 6/2008 | Wolas |
| 2008/0148481 A1 | 6/2008 | Brykalski et al. |
| 2008/0191521 A1 * | 8/2008 | Bajic et al. ............. 297/180.12 |
| 2009/0064411 A1 | 3/2009 | Marquette et al. |

FOREIGN PATENT DOCUMENTS

| | | |
|---|---|---|
| DE | 10115242 | 10/2002 |
| WO | WO 02/11968 | 2/2002 |
| WO | WO 03/051666 | 6/2003 |

* cited by examiner

VENTILATION SYSTEM FOR SEAT

CROSS-REFERENCE TO RELATED APPLICATIONS

This application claims the priority benefit under 35 U.S.C. §119(e) of U.S. Provisional Application No. 60/850,699, filed Oct. 10, 2006, the entirety of which is hereby incorporated by reference herein.

BACKGROUND

1. Field of the Inventions

This application relates to climate control, and more specifically, to climate control of a seat.

2. Description of the Related Art

U.S. Pat. No. 5,626,021 and U.S. Patent Publication 2005/0264086 disclose examples of individualized climate control systems for automobile seats. These climate control systems include a distribution system comprising a combination of channels and passages formed in the cushion of the automobile seat. Climate conditioned air is supplied to these channels and passages by a climate control device. The climate conditioned air flows through the channels and passages to cool or heat the space adjacent the surface of the automobile seat. Such climate control systems are increasingly popular features in automobiles.

Motorized wheelchairs are typically used by people that are confined to a bed or chair and are unable to use a manual wheelchair. Motorized wheelchairs are commonly powered by a pair of electric motors. A rechargeable battery is typically mounted beneath the wheelchair seat and electrically connected to the electric motors. Users of motorized wheelchairs are often confined to the wheelchair for long periods of time. Accordingly, it would be beneficial to provide the benefits of the climate control systems used in automobiles to a motorized wheelchair. However, there have been problems in adapting existing climate control systems for automobiles to motorized wheelchairs. For example, the cushions of a motorized wheelchair are typically thinner than that of an automobile seat. Accordingly, it can be difficult to position a distribution system within the cushion of a motorized wheelchair without compromising the comfort of the cushion. In addition, as compared to an automobile, the overall size and configuration of the climate control system must be smaller for a motorized wheelchair.

SUMMARY

Accordingly, one aspect of the present invention comprises a ventilation pad for a seat assembly. The pad comprises an air impermeable layer that defines a chamber having a width that is substantially equal to a width of the seat assembly. The layer has a first side facing generally a first direction towards an occupant of the seat assembly and a second side generally facing a second, opposite, direction, the first side. The layer has a plurality of holes extending into the chamber. An air permeable foam is positioned within the chamber. A diffusion layer is disposed on the first side of the layer over the plurality of holes. A seat covering comprises an air permeable material and is disposed on a side of the diffusion layer such that the diffusion layer.

Another aspect of the present invention comprises a climate controlled wheelchair, comprising: a support structure that supports a plurality of wheels, a backrest structure and a seat structure. A ventilation pad is provided on the seat structure. The pad comprises an air impermeable layer that defines a chamber having a width that is substantially equal to a width of the seat assembly. The layer has a first side facing generally a first direction towards an occupant of the seat assembly and a second side generally facing a second, opposite, direction, the first side. The layer has a plurality of holes extending into the chamber. An air permeable foam is positioned within the chamber. A diffusion layer is disposed on the first side of the layer over the plurality of holes. A seat covering comprises an air permeable material and is disposed on a side of the diffusion layer such that the diffusion layer.

According to some embodiments, a climate controlled seat assembly comprises a chamber defined by a substantially fluid impermeable layer, the fluid impermeable layer having a first side and second side, the first side comprising a plurality of openings, a support structure positioned within the chamber, the support structure being configured to substantially maintain the shape of the chamber, a fluid transfer device configured to provide a volume of fluid to the chamber, a fluid inlet in fluid communication with both the chamber and the fluid transfer device, a fluid distribution layer positioned adjacent to the first side of the fluid impermeable layer and a seat covering positioned along the fluid distribution layer. In some embodiments, the fluid distribution layer is configured to generally distribute fluid from the openings toward the seat covering.

Further features and advantages of the present invention will become apparent to those of ordinary skill in the art in view of the detailed description of preferred embodiments which follow, when considered together with the attached drawings and claims.

DETAILED DESCRIPTION OF THE PREFERRED EMBODIMENTS

FIGS. 1-4 are side, front, rear and top views of a motorized wheelchair 10 having a climate controlled seat system 12, which will be described in detail with reference to FIGS. 5 and 6. As shown, the wheelchair 10 comprises a base structure 16, which supports a set of front and rear wheels 14a, 14b. The base structure 16 also supports and/or forms part of a seat assembly 18, which comprises a seat portion 20 and a backrest portion 22.

The various embodiments disclosed and illustrated herein are relevant to wheelchairs. However, it should be appreciated that the features, components and other details of these embodiments can be applied to any type of seating assembly or similar device, such as, for example, automobile or other vehicle seats, beds, office chairs, sofas and/or the like.

In the illustrated embodiment, the seat portion 20 comprises a generally, planar horizontal support member 24, which can be formed from a metal, plastic, wood and/or any other rigid or semi-rigid material. A seat cushion 26 is positioned on the horizontal support member 24 to provide comfort to the user. In a similar manner, the backrest portion 22 comprises a generally, planar vertical support member 28, which can be formed from a metal, plastic, wood and/or the like. A seat cushion 30 can be positioned on the vertical support member 28.

The wheelchair 10 can also include a pair of armrests 32 that may be configured to extend from the base structure 16 to the sides of the seat and backrest portions 20, 22. The wheelchair 10 can be driven by one or more motors 34 (see FIGS. 3 and 4), which in some embodiments, are positioned beneath the horizontal support member 24 within the base structure 16. A battery (not shown) for powering the motors 24 can also be positioned beneath the horizontal support member 24 within the base 16. The battery can also be used to power one or more actuators 36, which can be used to steer the front wheels 14a of the wheelchair 10. A control device 38 can be provided on or near one of the armrests 32 for controlling movement of the wheelchair 10.

When an occupant sits in the wheelchair 10, the occupant's seat is located on a top surface 42 of the seat portion 20 and the occupant's back contacts a front surface 40 of the backrest portion 34. The backrest portion 22 and the seat portion 20 cooperate to support the occupant in a sitting position. The seat assembly 18 can be configured and sized to accommodate occupants of various size, weight and/or body type.

As mentioned above, the wheelchair 10 includes a climate control system 12, which has certain features and advantages that are particularly suited for a motorized wheelchair 10. However, it should be appreciated that certain features and aspects of the climate control device 12 and/or the wheelchair 10 described herein may also be used in a variety of other applications and environments. For example, certain features and aspects of the climate control system 12 and/or wheelchair 10 may be adapted for use in vehicles, such as, for example, automobiles, airplanes, boats, manual wheelchairs and/or the like. Further, certain features and aspects of the wheelchair 10 and/or climate control system 12 may also be adapted for use in stationary environments, such as, for example, chairs, sofas, theater seats, office seats that are used in a place of business and/or residence and/or the like. In addition, certain features and aspects of the control device 12 and/or wheelchair can be adapted for use in devices that do not support a person in a seated position, such as, for example, beds, reclining chairs and/or the like.

As discussed, the seat portion 20 can comprise a seat cushion 26 and a horizontal support member 24. One embodiment of a cross-section of the seat portion 20 and the seat cushion 26 is illustrated in FIG. 5. As shown, the seat cushion 26 is generally supported above the support member 24. In the illustrated embodiment, a support pad 50 is positioned between the seat cushion 26 and the support member 24. In one embodiment, the support pad 50 comprises a cover 52, which can be configured to partially or completely enclose a gel-type material 54 to provide additional support and comfort to an occupant. In modified embodiments, the wheelchair 10 can be provided without the support pad 50 or the support pad 50 can be formed of other materials (e.g., open or closed foam, memory foam, heat sensitive foam, etc.).

Figure 5:
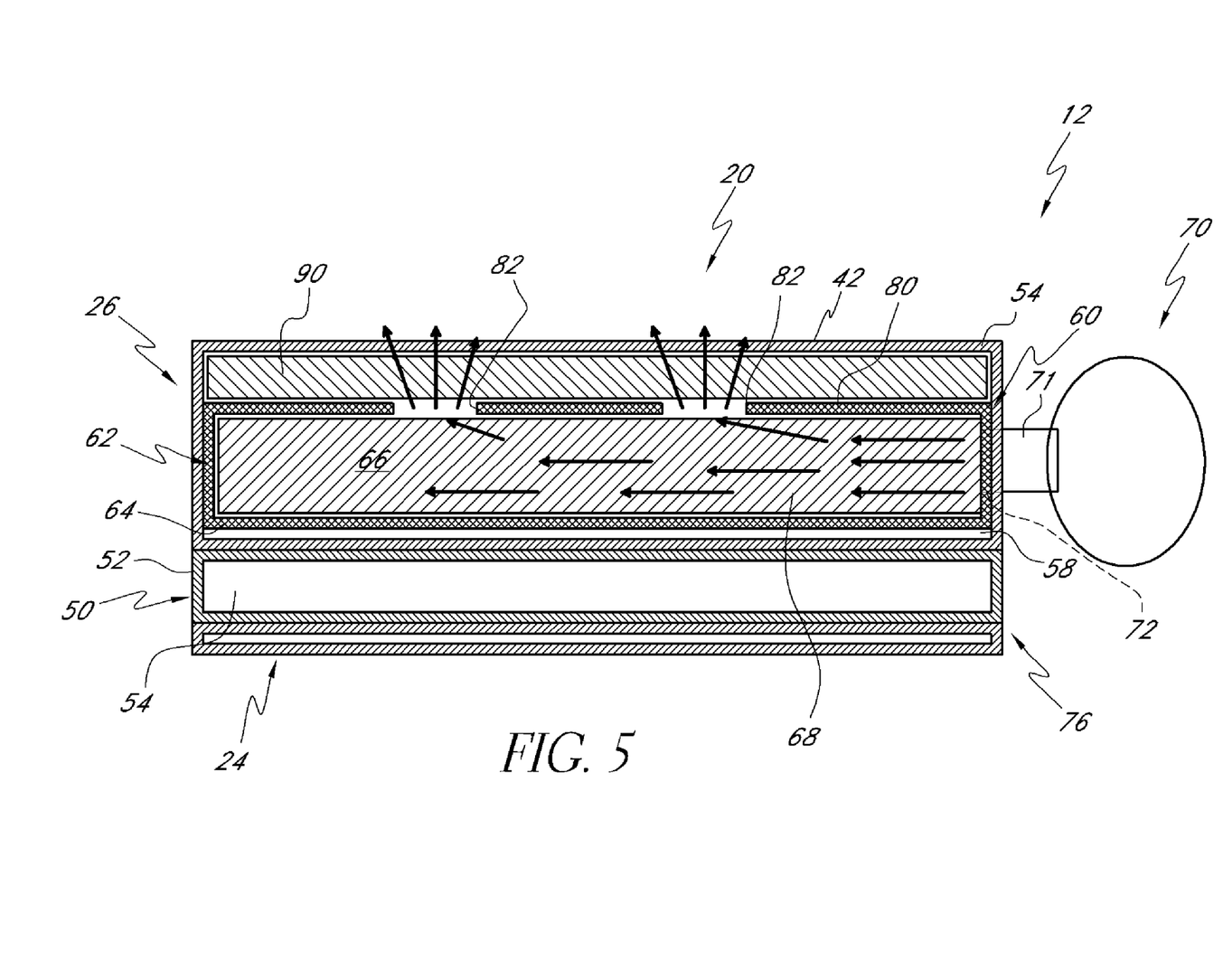
FIG. 5 is a cross-sectional view taken along line 5-5 of FIG. 2.

With continued reference to the embodiment illustrated in FIG. 5, the seat cushion 26 includes an appropriate covering 56 material such as, for example, upholstery, vinyl, leather, other fabric and/or the like. In the illustrated embodiment, the covering 56 has a generally rectangular or square box-type shape, which defines an enclosed interior space 58. In modified embodiments, however, the covering 56 can have a different vertical and/or horizontal cross-sectional shape (e.g., round, oval, trapezoid, diamond, other polygonal, irregular, etc.) and/or does not define an enclosed interior space. The covering 56 material preferably provides an aesthetic appearance and soft feel to the surface of the seat portion 20. As discussed further herein, in some embodiments, the covering 56 is made of an air permeable material and/or includes one or more portions that are configured to be air permeable (e.g., by providing holes or other openings in the covering 56).

Within the interior space 58, the cushion 26 can include an air distribution system 60 for receiving air or other fluid from a fluid transfer device and distributing it toward the top surface 42 of the seat cushion 26. The air distribution system 60 can comprise a first distribution member 62. The first distribution member 62 can include a substantially air impermeable material 64 (e.g., plastic, rubber, vinyl, etc.) that defines a substantially enclosed chamber 66. In some embodiments, the air impermeable material 64 is preferably sized, shaped and/or otherwise configured such that the chamber 66 has a width (W), length (L), depth and/or other dimensions (see FIG. 4) to generally match or otherwise suit the dimensions (e.g., width and length) of the seat cushion 26. The air impermeable material can comprise a unitary structure (e.g., bag, sac, other container, etc.) or two or more components that are securely attached to one another.

With continued reference to FIG. 5, a distribution and support material 68 can be positioned within the chamber 66. According to some embodiments, the distribution and support material 68 is preferably a material that can provide cushioning support while also permitting the passage of air or other fluid along a portion or the entire width and length of the chamber 66. For example, in one embodiment, the distribution and support material 68 comprises a fibrous, honeycomb and/or a porous material. In some embodiments, the support material 68 comprises porous, air-permeable foam or other similar material.

As schematically illustrated in FIG. 5, air or other fluid can be supplied to and/or removed from the air distribution system 60 using one or more fluid transfer devices 70 (e.g., a fan, blower, air pump, etc.). In some embodiments, such a fluid transfer device 70 is placed in fluid communication with the chamber 66 using a conduit 71 that extends through a passage 72 and into the interior of the air impermeable material 64.

Figure 1:
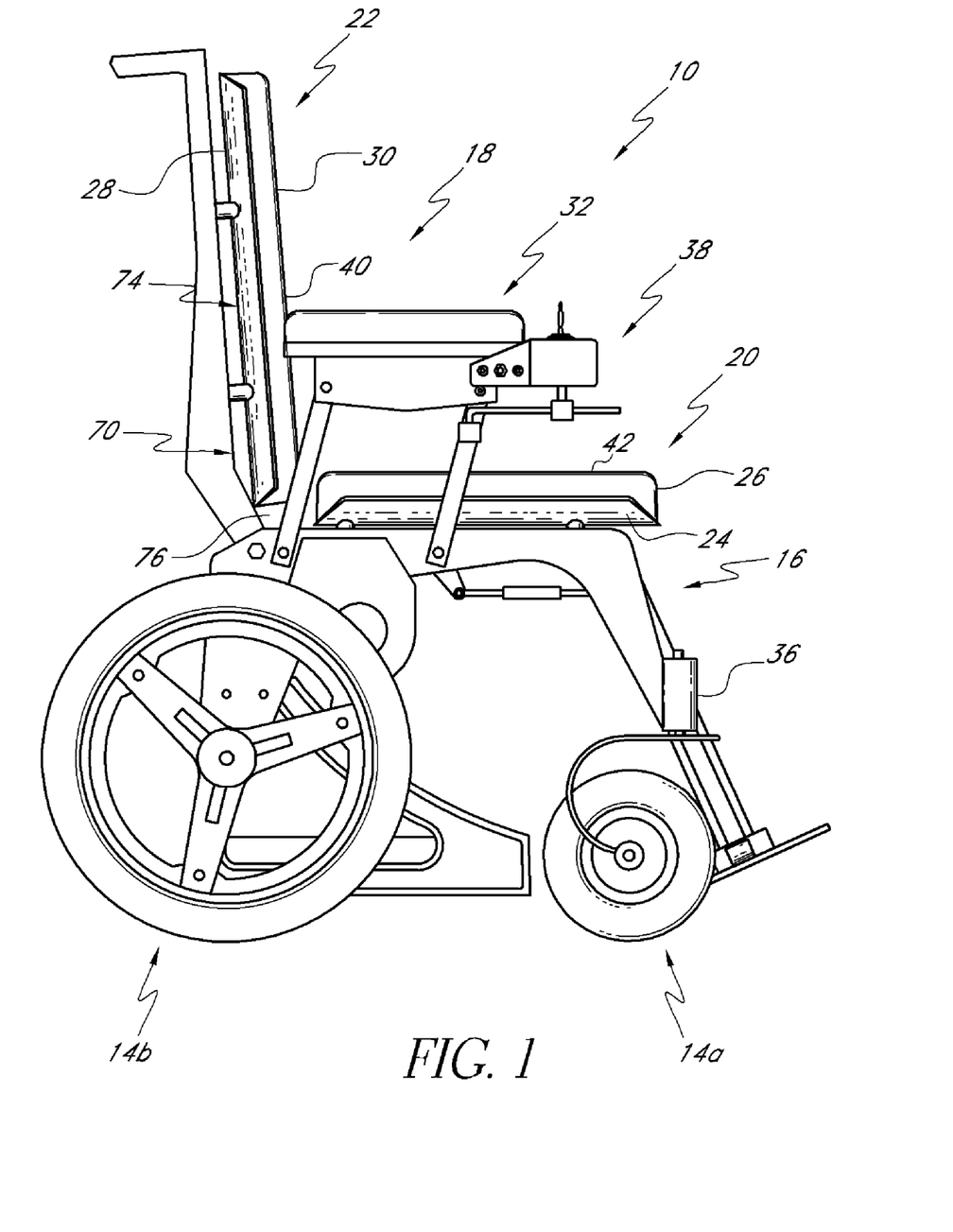
FIG. 1 is a side view of an embodiment of a motorized wheelchair, which includes a climate control system that is configured in accordance with one embodiment of the present inventions.
Figure 2:
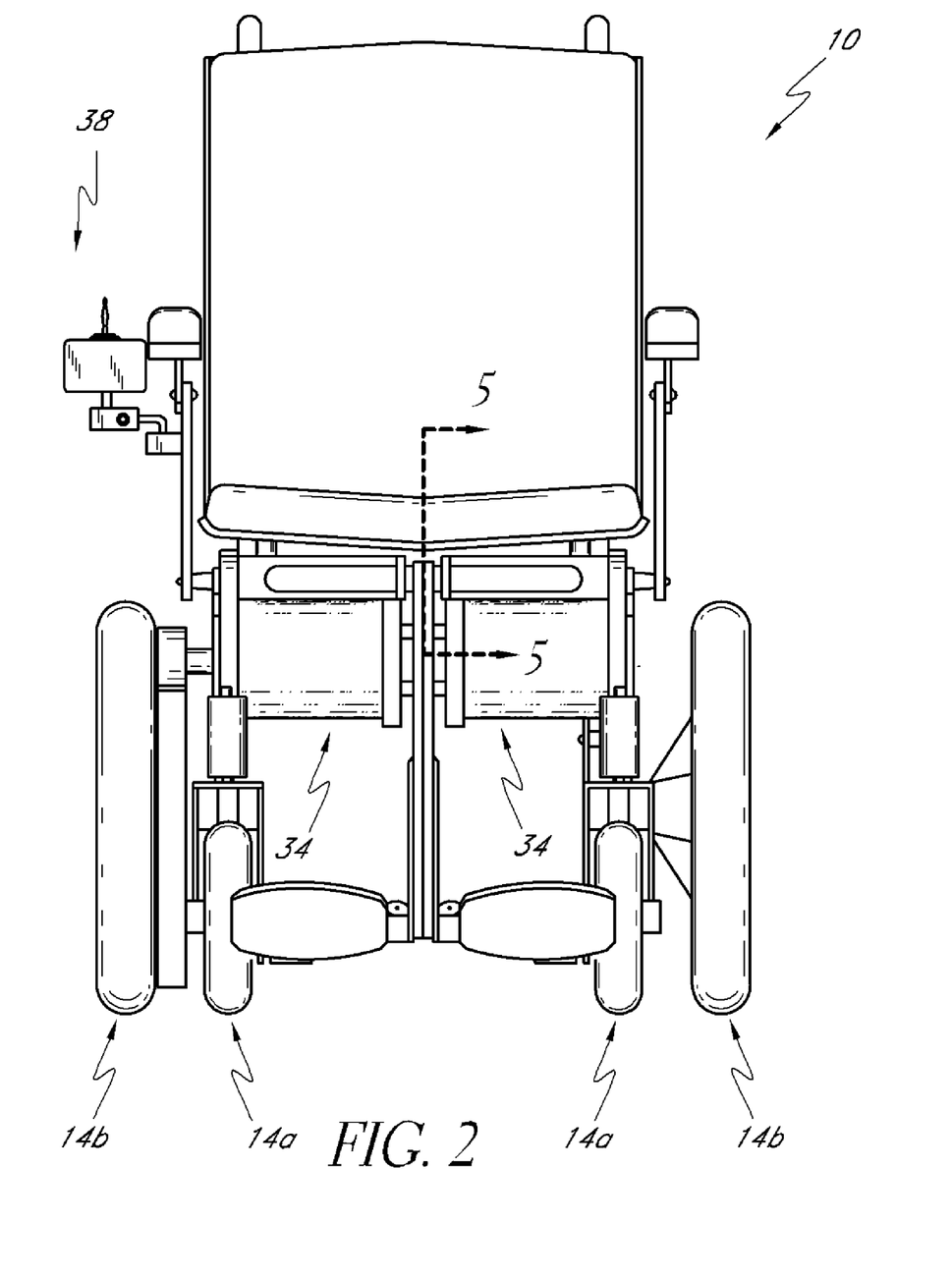
FIG. 2 is a front view of the motorized wheelchair of FIG. 1.
Figure 3:
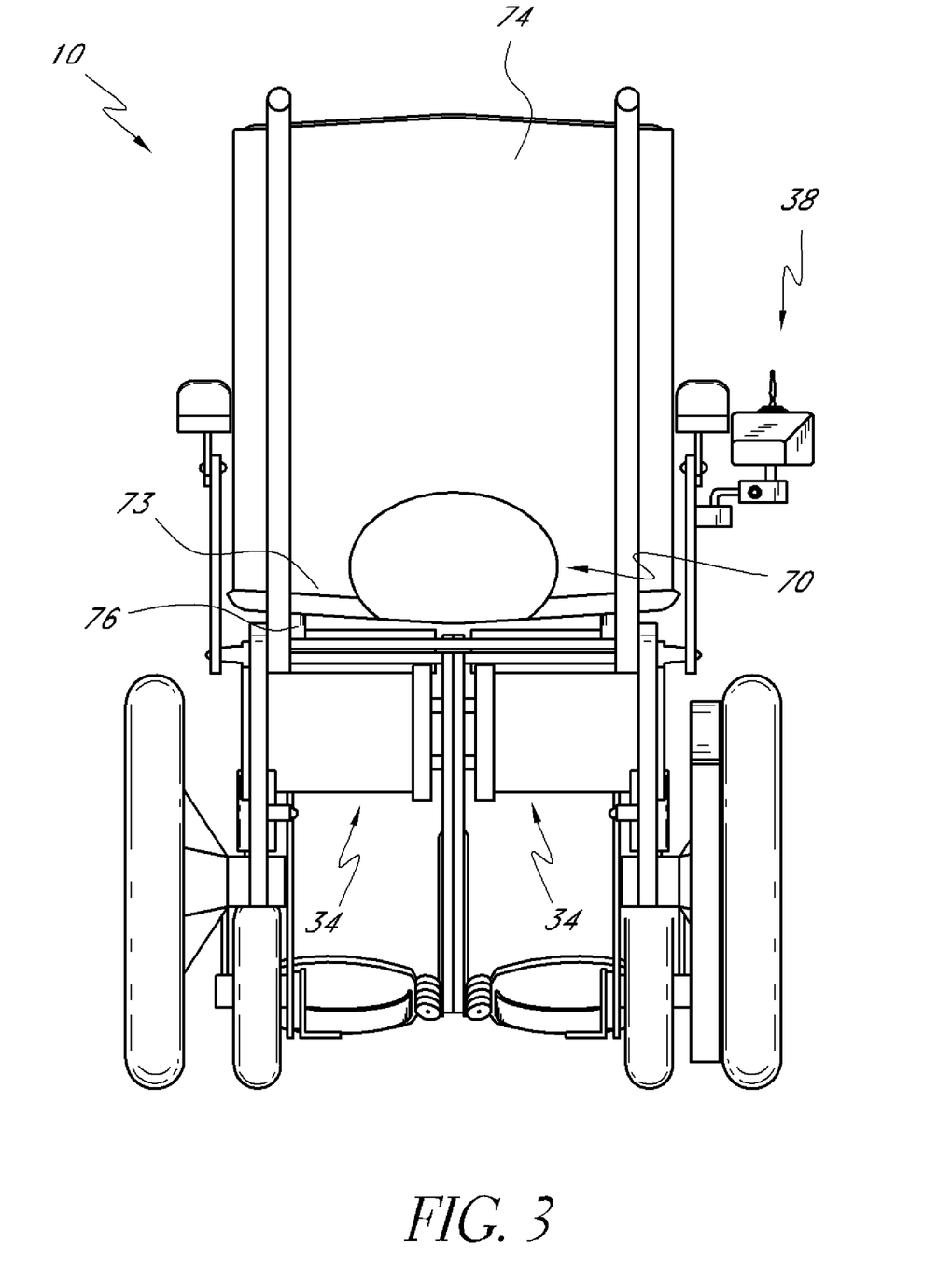
FIG. 3 is a rear view of the motorized wheelchair of FIG. 1.
Figure 4:
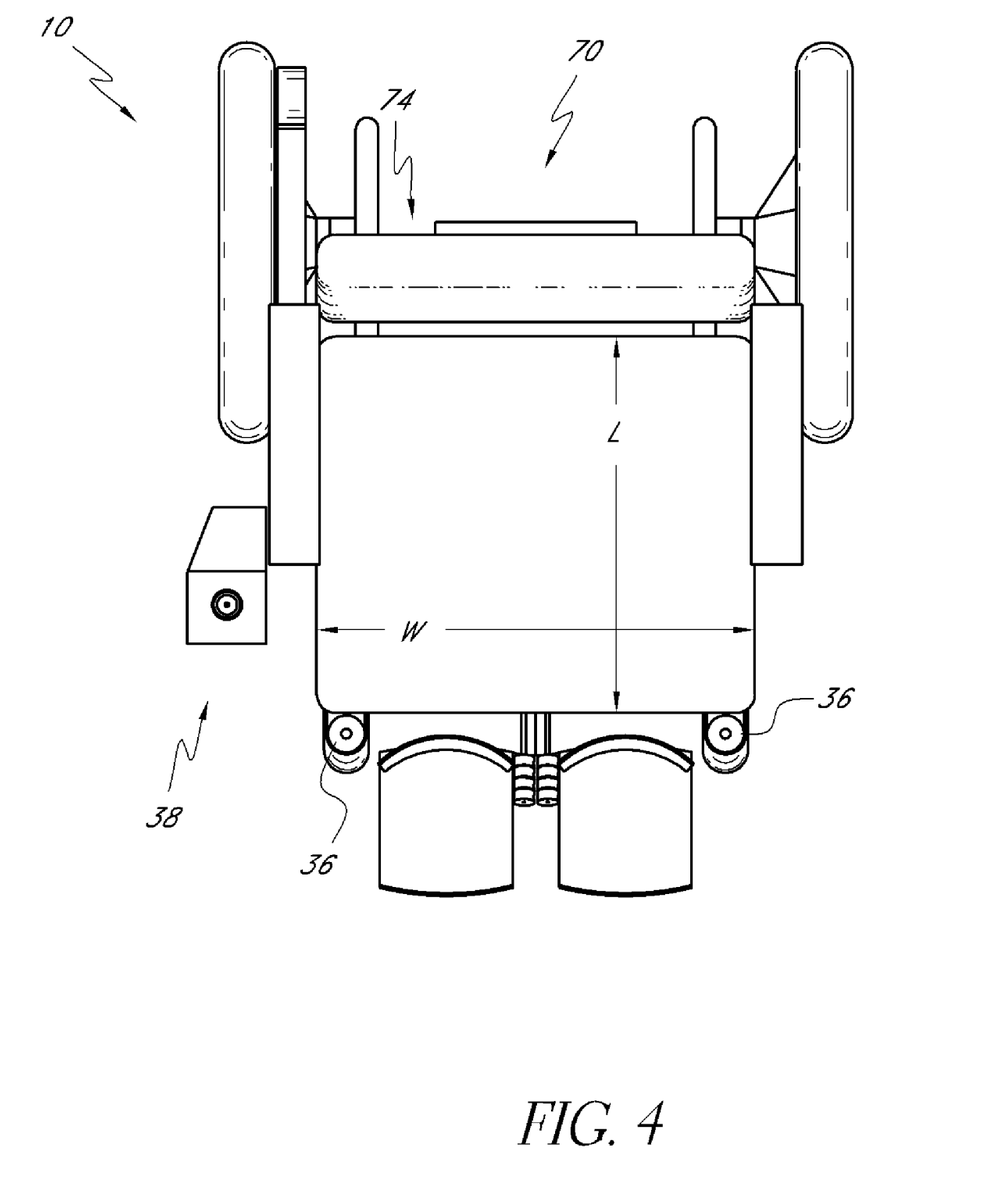
FIG. 4 is a top plan view of the motorized wheelchair of FIG. 1.

As shown in FIGS. 3 and 4, the fluid transfer device 70 can be positioned on a lower end 73 of a rear side 74 of the backrest support member 28. As illustrated herein, a gap 76 can exist between the lower end 73 of the backrest support member 28 and the seat support member 34. The gap 76 can be configured to provide access to a rear side of the cushion 26 through which the conduit 71 and/or passage 72 that places the fluid transfer device 70 in fluid communication with the chamber 66 can extend. The backrest support member 28 can also be used to support and/or mount the fluid transfer device 70. In some embodiments, such an arrangement is advantageous because, as discussed herein, the motor 34 and battery (not shown) are sometimes positioned below the seat support member 24. Further, such an arrangement allows the conduit 71 and/or passage 72 to not extend through the support pad 50. Thus, such embodiments can be quickly and cost-effectively integrated into many existing powered wheelchairs that utilize similar support pads.

With reference back to FIG. 5, the top or upper portion 80 of the impermeable material 64 can comprise a plurality of orifices or apertures 82 to permit the air or other fluid which enters the chamber 66 to be directed towards an occupant. In modified embodiments, the upper portion can include porous or permeable portions for permitting the flow of air into and/or out of the chamber 66. For example, a fluid distribution layer 90 can be advantageously disposed between the top portion 80 of the impermeable material 64 and the covering 54. The fluid distribution layer 90 can be configured to more evenly spread the air or other fluid flowing through the openings 82 along bottom surface of the covering 84. To permit airflow between the fluid distribution layer 90 and the spaces proximal to the front surface 42 of the seat 20, the covering 54 can be formed from an air-permeable material. For example, in one embodiment, the covering 54 comprises an air-permeable fabric made of natural and/or synthetic fibers. In another embodiment, the covering is formed from a leather, or leather-like material that includes a plurality of small openings or apertures. In certain embodiments, the distribution layer can comprise a fibrous, honeycomb or other porous material.

The thickness of the fluid distribution layer 90 can be selected to further enhance the distribution of air or other fluid exiting the chamber 66. For example, in some embodiments, the fluid distribution layer 90 can include a rigid or semi-rigid porous component that is configured to provide substantially even air or other fluid flow when it exits the fluid distribution layer 90 along its interface with the covering material 56. Therefore, the impermeable material 64 can advantageously include fewer openings or other orifices 82 along its upper surface.

The fluid distribution layer 90 can be shaped to provide air or other fluid to the entire top surface of the seating assembly. However, in other embodiments, where fluid flow is only desired in certain targeted regions (e.g., expected contact regions with an occupant's legs, lower back, etc.), the fluid distribution layer 90 can be shaped, sized and/or otherwise configured to be located only in selected regions.

As discussed, in order to maintain a desired three-dimensional shape during use, the impermeable material 64 can comprise one or more support materials 68. Such support materials 68 can comprise a porous structure that permits air or other fluid to pass therethrough. Preferably, these support materials 68, along with the impermeable material 64 and all other components of the assembly, are configured to withstand the weight of occupants and/or any other forces or stresses to which they will be exposed. In addition, the support materials 68 can be sized, shaped and otherwise configured to occupy the entire chamber 66 of the impermeable material or only a portion of it, as desired or required by a particular application.

In operation, fluid in the form of air can be delivered from the fluid transfer device 70 to the distribution system 62. The air or other fluid flows through the orifices 82 into the distribution layer 90, where, as discussed above, it can be more evenly distributed, and then through the covering 54. In this manner, air can be provided to the top surface 42 of the seat 20.

In a modified embodiment, air from the top surface 42 can be drawn through the covering 54 into the distribution layer 90 and through the orifices 82. The air then can flow through the distribution system and out the fluid transfer device 70. In this manner, the fluid transfer device 70 can provide the necessary suction or vacuum force so that air near the surface of the seat 20 is removed.

As discussed further herein, the fluid transfer device 70 can be configured to provide temperature-conditioned air (and/or to remove air in some embodiments) to the distribution system 62. In this manner, the fluid transfer device 70 can provide a fluid flow to either warm and/or cool the top surface 42 of the seat 20. In such embodiments, the fluid transfer device can include one or more heating and/or cooling elements. In modified embodiments, the fluid transfer device 70 can be configured to provide unconditioned (e.g., ambient) air to the front surface 42 of the seat 20. In such arrangements, the fluid module can include a pumping element (e.g., an axial or radial fan).

The climate control system 12 and distribution system 62 disclosed herein has been described with reference to a seat 20. However, it is anticipated that one or more features of the climate control system 12 and distribution system 62 can be applied to other parts of the wheelchair 10 (e.g., the backrest portion 22) or to other seating assemblies (e.g., beds, office chairs, sofas, etc.) altogether.

Given the goal of distributing air through the seat 20 and to the front surface 42 of the seat assembly 30, those of skill in the art will recognize that the distribution system 62 can be modified in several different manners. For example, as mentioned above, in one embodiment, the distribution layer 90 is removed. In another embodiment, the covering 54 does not surround the distribution system 62 and can be attached or otherwise coupled to an upper portion of the distribution system 62.

Figure 6:
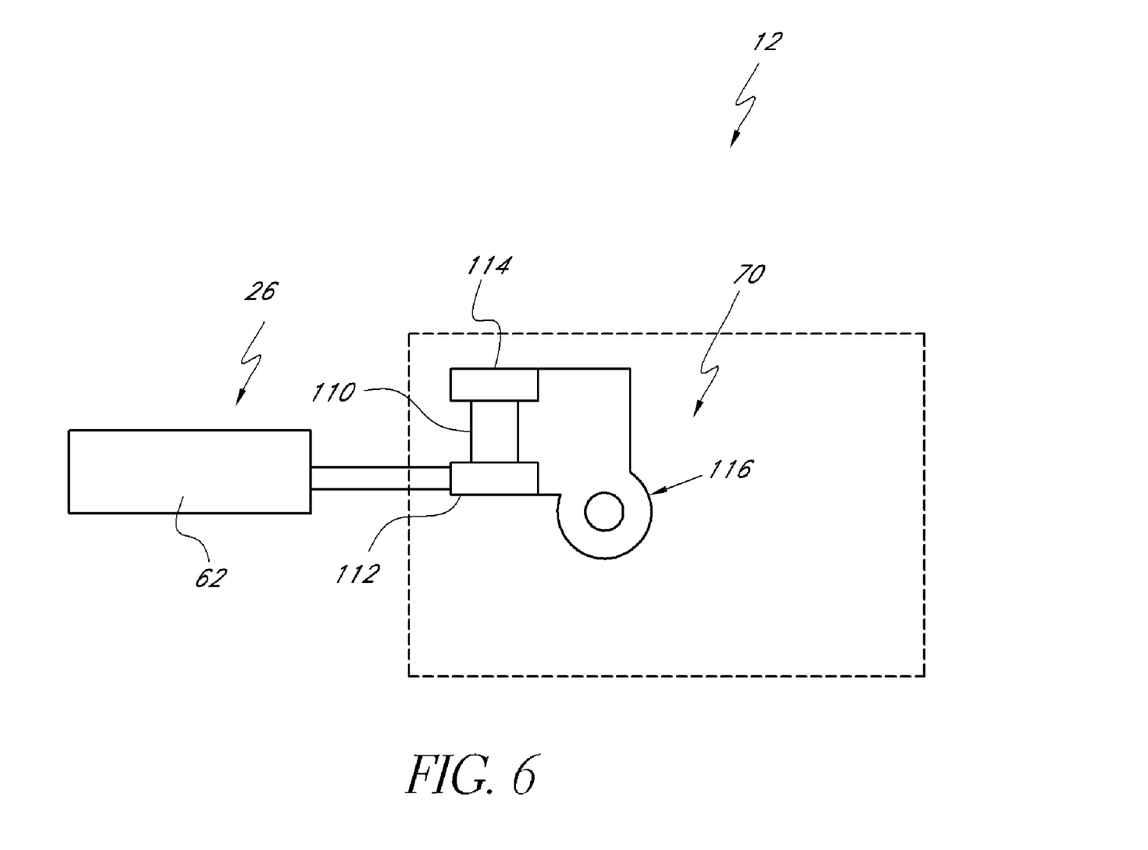
FIG. 6 is a schematic illustration of the motorized wheelchair and climate control system of FIG. 1

FIG. 6 is a schematic illustration of the climate control system 12 described above. Specifically, this figure schematically illustrates the fluid transfer device 70 and the seat 26. In the illustrated embodiment, the fluid transfer device 70 preferably includes one or more thermoelectric devices 110 for temperature conditioning (i.e. selectively healing or cooling) the fluid flowing through the device 110. A preferred thermoelectric device 110 is a Peltier thermoelectric module, which is well known in the art. The fluid transfer device 70 can also include a main heat exchanger 112 for transferring or removing thermal energy from the fluid flowing through the fluid transfer device 70 and to the distribution systems 62. Further, the device 70 can also preferably include a secondary heat exchanger 114 that extends from the thermoelectric device 110 generally opposite the main heat exchanger 112. As discussed, the system can comprise one or more fluid transfer devices 116 which help direct fluid over the main and/or waste heat exchangers 112, 114. The fluid transfer device 116 can comprise an electrical fan or blower, such as, for example, an axial blower and/or radial fan. In the illustrated embodiment, a single pumping device 116 can be used for both the main and waste heat exchanges 112, 114. However, it is anticipated that separate pumping devices may be associated with the secondary and heat exchangers 112, 114.

It should be appreciated that the fluid transfer device 70 described above represents only one exemplary embodiment of a device that may be used to condition the air supplied to the distribution system 62. Any of a variety of differently configured fluid modules may be used to provide conditioned air. Other examples of fluid modules that may be used are described in U.S. Pat. Nos. 6,223,539, 6,119,463, 5,524,439 or 5,626,021, which are hereby incorporated by reference in their entirety. Another example of such a fluid module is currently sold under the trademark Micro-Thermal Module™ by Amerigon, Inc. In another example, the fluid module may comprise a pump device without a thermoelectric device for thermally conditioning the air. In such embodiments, the fluid transfer device may be used to remove or supply air to the distribution system 62. In yet another embodiment, the fluid transfer device 70 can share one or more components (e.g., pumping devices, thermoelectric devices, etc.) with a vehicle's (e.g., automobile's, airplane's, etc.) general climate control system.

To assist in the description of the disclosed embodiments, words such as upward, upper, downward, lower, vertical, horizontal, upstream, and downstream have and used above to describe the accompanying figures. It will be appreciated, however, that the illustrated embodiments can be located and oriented in a variety of desired positions.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A climate controlled wheelchair assembly comprising:
   a chamber, wherein the chamber is enclosed to define an interior space, the chamber formed by a fluid impermeable layer, the chamber having a top side, a bottom side, and a peripheral edge between the top side and the bottom side, the top side of the chamber comprising a plurality of openings;
   a support structure positioned within the chamber, said support structure being configured to substantially maintain the shape of the chamber and to help permit the passage of fluid within the chamber;
   a fluid module configured to selectively provide fluid to the chamber, said fluid module comprising a fluid transfer device;
   a fluid inlet in fluid communication with both the chamber and the fluid module;
   a fluid distribution layer positioned adjacent to the first side of the fluid impermeable layer;
   a seat covering positioned along the fluid distribution layer, said seat covering comprising an air permeable material;
   wherein the fluid distribution layer is configured to generally distribute fluid exiting from the openings of the fluid impermeable layer toward the seat covering;
   a conduit in fluid communication with the fluid module and the fluid inlet, such that fluid is selectively delivered from the fluid module to the chamber;
   a battery configured to supply electrical power to the fluid module, wherein said battery is rechargeable;
   a support pad positioned adjacent to the second side of the fluid impermeable layer, said support pad comprising a support material;
   wherein the support pad is configured to provide support and comfort to an occupant of the wheelchair assembly;
   wherein the fluid impermeable layer and the fluid distribution layer are configured to selectively direct fluid flow to targeted regions of the wheelchair assembly; and
   wherein the fluid from the fluid module exits the chamber through the plurality of openings in the top side of the chamber.

2. The climate controlled wheelchair assembly as in claim 1, wherein the conduit does not extend through the support pad.

3. The climate controlled wheelchair assembly as in claim 1, wherein the support material comprises a gel or a foam.

4. The climate controlled wheelchair assembly as in claim 1, wherein the fluid impermeable layer comprises a unitary structure or at least two components, wherein said at least two components are securely attached to one another.

5. The climate controlled wheelchair assembly as in claim 1, wherein the support structure is configured to direct a fluid to at least a first portion and a second portion, wherein said first portion is configured to generally distribute fluid to a first part of an occupant and said second portion is configured to generally distribute fluid to a second part of an occupant.

6. The climate controlled wheelchair assembly of claim 1, further comprising at least one thermoelectric device configured to temperature condition the fluid delivered by the fluid module.

7. The climate controlled wheelchair assembly as in claim 1, wherein the support structure comprises porous foam.

8. The climate controlled wheelchair assembly as in claim 1, wherein the chamber comprises a width that is substantially equal to a width of the support pad.

* * * * *